United States Patent
Sweeney et al.

(12)

(10) Patent No.: US 6,652,947 B2
(45) Date of Patent: Nov. 25, 2003

(54) DISPOSABLE, ABSORBENT MAT FOR HIGH CHAIRS

(76) Inventors: Lisa A. Sweeney, 11925-53rd St., Ct. E, Edgewood, WA (US) 98392; Steven T. Sweeney, 11925-53rd St., Ct. E, Edgewood, WA (US) 98392

( * ) Notice: Subject to any disclaimer, the term of this patent is extended or adjusted under 35 U.S.C. 154(b) by 62 days.

(21) Appl. No.: 09/960,185

(22) Filed: Sep. 21, 2001

(65) Prior Publication Data

US 2002/0037387 A1 Mar. 28, 2002

Related U.S. Application Data

(60) Provisional application No. 60/234,615, filed on Sep. 22, 2000.

(51) Int. Cl.[7] ................................................. B32B 3/02
(52) U.S. Cl. ....................................................... 428/43
(58) Field of Search ............................... 428/43; 4/251.1

(56) References Cited

U.S. PATENT DOCUMENTS

| 2,585,434 | A  |    | 2/1952  | Caponera |
| 3,298,736 | A  |    | 1/1967  | Decker |
| 4,165,123 | A  |    | 8/1979  | Hutson |
| 4,483,895 | A  |    | 11/1984 | Deaver |
| 5,660,432 | A  |    | 8/1997  | Davis |
| 6,174,581 | B1 | *  | 1/2001  | Barker .......................... 428/43 |
| 6,177,164 | B1 | *  | 1/2001  | Sullens et al. ................. 428/43 |

* cited by examiner

*Primary Examiner*—Alexander S. Thomas
(74) *Attorney, Agent, or Firm*—Polly L. Olner

(57) ABSTRACT

Herein is disclosed a disposable, slip-resistant, leak-proof mat for use with infant high chairs and the like. The preferred embodiment of the present invention comprises a three-ply sheet which is perforated to fit easily and quickly beneath an infant's high chair. The sheet comprises a top absorbent layer, a middle absorbent layer, and a bottom slip-resistant, waterproof layer, all of which are joined together by bonding or some other conventional joining process.

7 Claims, 3 Drawing Sheets

DISPOSABLE, ABSORBENT MAT FOR HIGH CHAIRS

RELATED APPLICATION

This application claims priority under 35 U.S.C. §119(e) to U.S. provisional application Ser. No. 60/234,615 filed Sep. 22, 2000.

FIELD OF THE INVENTION

The invention relates generally to floor mats and more particularly to a disposable, slip-resistant, leak-proof mat for infant/toddler high chairs.

BACKGROUND OF THE FIELD

As every parent knows, infants and toddlers are messy eaters. They routinely drop or throw food, dishes, and utensils all around the kitchen but particularly on the floor immediately beneath their high chairs. Despite the need to clean up the area after feeding a child, a parent frequently finds that he/she must focus on the child and cannot divide his/her attention to perform the necessary clean-up tasks.

Various previously patented inventions have addressed this problem. However, they all fall short of the present invention in one way or another. For instance, U.S. Pat. No. 4,483,895 to Deaver discloses a disposable absorbent mat that can be placed beneath a high chair to catch food, etc. With Deaver's mat, the parent must still take the time and expend the effort to move the high chair to place the mat into position and then move it again to remove the mat for disposal. Likewise, U.S. Pat. No. 2,585,434 to Caponera discloses a U-shaped floor mat that surrounds the two front legs of a high chair. Although Caponera's mat does not require moving the high chair to position the mat, it also does not cover the area directly beneath the high chair and therefore does not catch many of the dropped items.

There have also been several tray aprons or troughs more elaborately attached around the high chair, such as those devices disclosed in U.S. Pat. Nos. 4,165,123 to Hutson, 5,660,432 to Davis, and 3,298,736 to Decker.

SUMMARY OF THE INVENTION

One aspect of the present invention comprises a perforated, absorbent sheet that a user can quickly and easily place beneath an infant high chair so as to catch liquids and foods that have been dropped by the infant during feeding. The perforations are strategically placed and allow the user to quickly tear, fold, and configure the mat beneath the high chair without moving the high chair, thereby covering the entire area under and around the high chair's legs. The user can then just as easily gather up the mat for disposal when feeding is through.

The preferred embodiment of the sheet has three layers: a top liquid absorbing layer, a middle absorbent layer, and a bottom layer which is not absorbent but is waterproof, so that it provides a barrier between the top layers and the floor. The bottom layer also is slip-resistant and non-adhesive, providing a secure grip on the floor, but one that is easy to break so that the user can quickly gather up the used mat and dispose of it.

The techniques for inexpensively manufacturing such absorbent and slip-resistant materials and for joining such materials together, such as by bonding, are well known in the manufacture of paper, plastic, and rubber/latex products. These techniques can readily be used to manufacture the present invention.

DETAILED DESCRIPTION OF THE PREFERRED EMBODIMENT

The figures depict several, but not all, embodiments of the present invention of the disposable, absorbent, slip-resistant, leak-proof mat for high chairs and the like. Although the illustrations and descriptions discuss a high chair, it is envisioned that the present invention will be used with like objects, such as chairs, and for other purposes.

Figure 1:
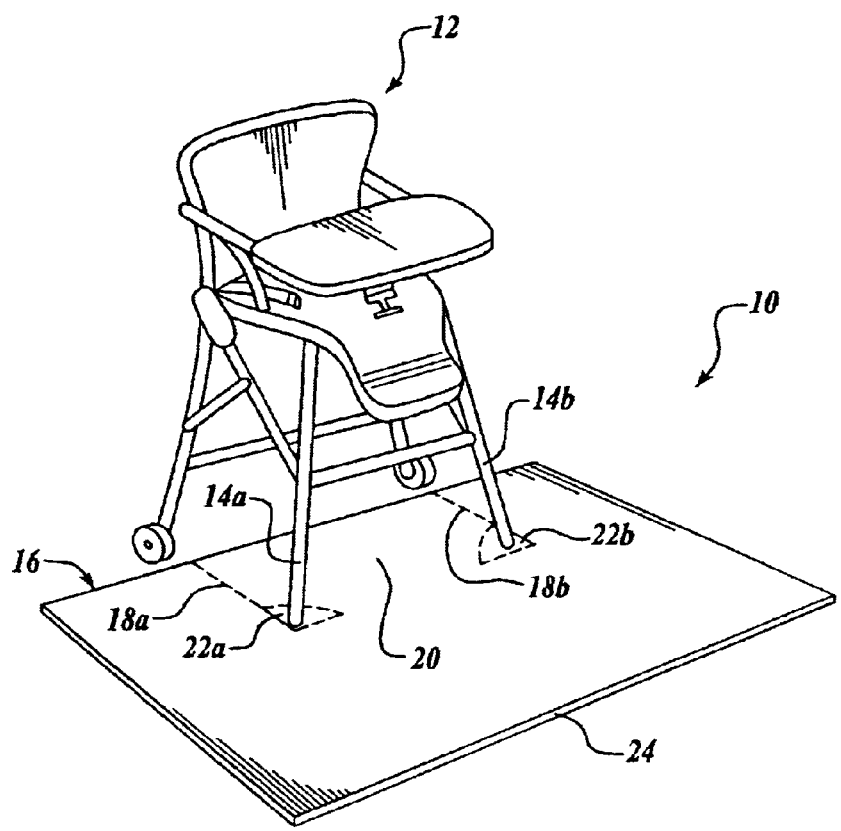
FIG. 1 is a perspective view showing the preferred embodiment of the mat centered beneath and surrounding the front and sides of an infant/toddler high chair.

FIG. 1 shows the preferred embodiment of the high chair mat 10 positioned underneath an infant/toddler high chair 12 (not part of the invention), whose front two legs, 14a and 14b, are oriented towards the front of the mat 10, which in the preferred embodiment is rectangular in shape. Although not depicted, the mat 10 can originally be delivered in a folded and/or rolled format/condition.

Extending from the back edge 16 of the mat 10, are perforated lines 18a and 18b which allow the center flap 20 to unfold forward from its original position underneath the high chair 12, to fit closely around the lower part of the front legs 14, and to fold back into its original resting position. When the center flap 20 is folded forward, the front leg openings 22a and 22b will be uncovered so that the front legs 14 can be positioned inside the front leg openings 22a and 22b. The front leg openings 22 are wide enough to accommodate a variety of sizes and designs of high chairs.

As shown in FIG. 1, the mat 10 extends well beyond the front and the sides of the high chair 12, thereby allowing food and/or liquid dropped by an infant or toddler sitting in the high chair 12 to land on the mat 10. The perforated lines 18 allow the center flap 20 of the mat 10 to be folded up from underneath the chair, towards the front edge 24 of the mat 10, and the sides to be folded up, retaining the food and/or liquid in the mat 10 for easy disposal. The high chair 12 does not have to be moved in order for the user to gain access to place or remove the mat 10.

Figure 2:
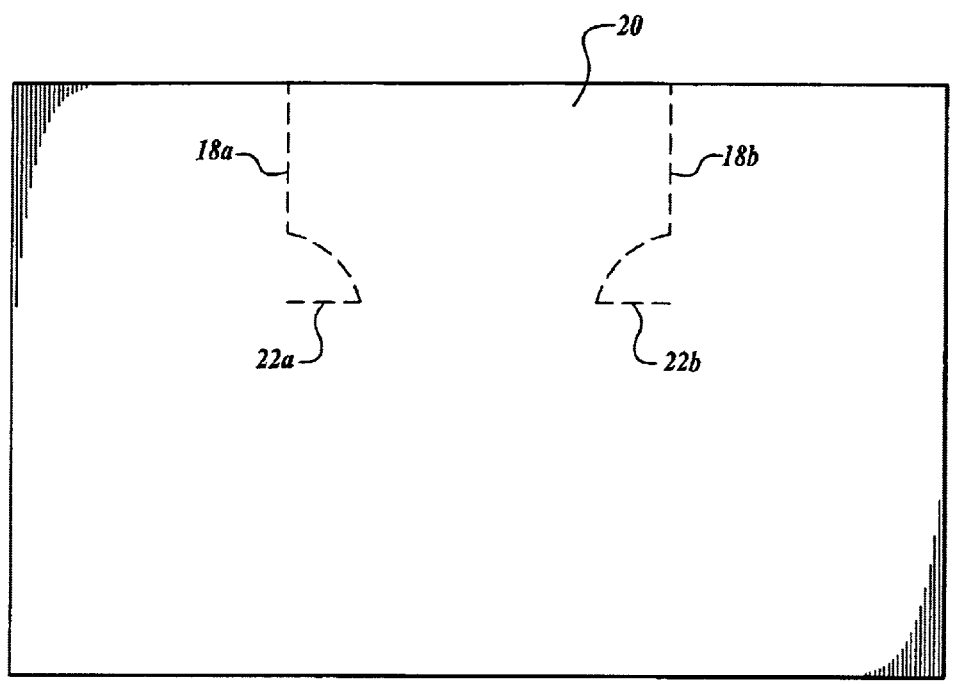
FIG. 2 is a top view of the preferred embodiment showing the perforations while the mat is still in an unfolded position.

FIG. 2 is a top view of the mat 10. FIG. 2 illustrates the perforated lines 18 and the perforated flaps 26 for the front leg openings 22. The preferred embodiment has front leg openings 22 that are half-moon shaped; however, the openings 22 may be in different shapes such as triangular shapes. In alternate designs, the perforations can simply continue in a generally straight line to the front edge of the sheet without any shapes for leg openings. The perforated lines 18 allow the center flap 20 to be folded towards the front of the high chair 12 for placement of the mat 10 under and around the high chair 12. The center flap 20 can then be placed back to its original resting position beneath the high chair 12. The preferred embodiment of the mat 10 is typically to be placed in a position such that the back edge 16 of the mat 10 is oriented towards the back of the high chair 12. However, it may also be reversed allowing the back edge 16 of the mat 10 to be oriented towards the front of the high chair 12. The ability to fold the center flap 20 forward, place the mat 10 around the high chair 12, and return the center flap 20 to its resting position enables the user to place and remove the mat without having to move the high chair.

Figure 2A:
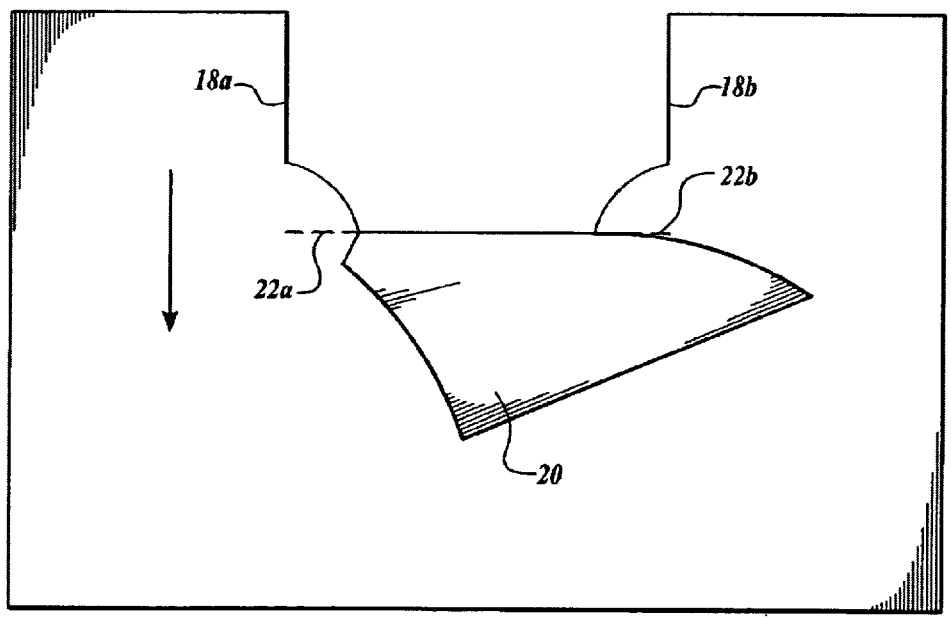
FIG. 2A is top detail view of the preferred embodiment showing the mat in an unfolded position.

FIG. 2A is a further illustration of how the center flap 20 folds forward in the direction of the arrow shown. The center flap 20 moves away from the back edge 16 in the direction of the perforated lines 18a and 18b. When the center flap 20 is in this unfolded position, the front leg openings 22a and 22b become open and useable. The mat 10 is placed down and around the high chair 12, and the high chair's front legs 14a and 14b are positioned in the front leg openings 22a and 22b respectively. The front leg openings 22a and 22b are large enough to accommodate various sizes and designs of high chairs. The center flap 20 is then folded back underneath the high chair 12 making a somewhat solid mat area beneath and around the high chair 12. If the high chair 12 has a center bar between its front legs 14a and 14b (not depicted), then the mat 10 can either be folded back under the bar or over it. Food and/or liquid dropped by the child sitting in the high chair can fall on the mat 10, thus protecting the floor and enabling easy clean up. When it is time to clean up the area, the center flap 20 is again folded towards the front of the high chair 12, enclosing whatever food and/or liquid is on that section. The sides and front of the mat 10 are then also gathered up enclosing food and/or liquid, and the entire mat 10 is then disposed of.

Figure 2B:
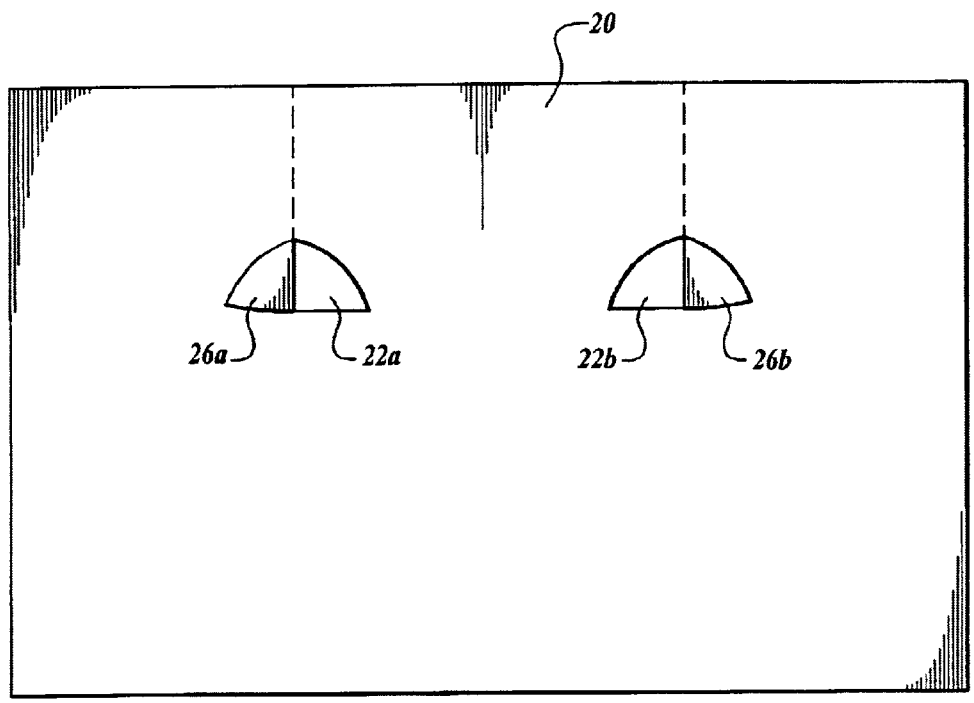
FIG. 2B is a top detail view of the preferred embodiment showing the mat in the useful position.

FIG. 2B is a further top view of the mat 10 illustrating the front leg openings 22a and 22b after the mat 10 has been unfolded and the center flap 20 has been returned to its resting position, as illustrated in FIG. 2A. Once this has been done, the perforated shapes of the front leg openings 22a and 22b form pre-cut flaps 26a and 26b used to help cover the lower section of the high chair's front legs 14a and 14b. The flaps 26a and 26b help keep food and/or liquid from escaping the mat 10 through the leg openings 22a and 22b.

Figure 3:
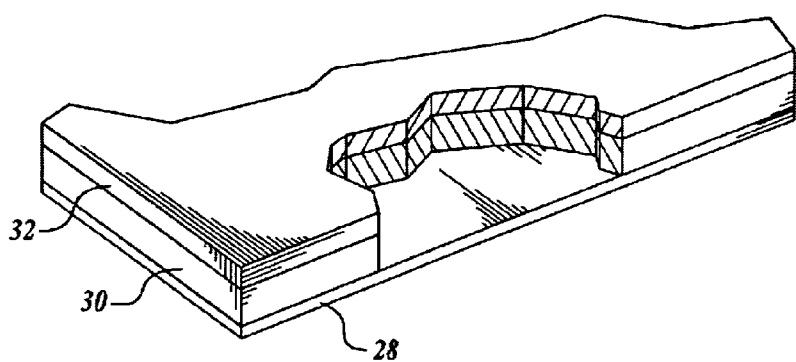
FIG. 3 is a detail view illustrating a partial cross section of the preferred embodiment.

FIG. 3 is a partial cross section of the high chair mat 10 in which a sheet of slip-resistant waterproof barrier 28 forms the bottom layer of the mat 10. The slip-resistant material helps keep the mat 10 in a stationary position. A middle absorbent material 30 is firmly joined to the bottom barrier sheet 28. The middle layer 30 is also firmly joined to a top liquid absorbent material 32. Most liquid and/or food dropped by the infant or toddler sitting in the high chair 12 will be held by the absorbent layers 32 and 30. The materials may be smooth or may be embossed to improve strength. The waterproof barrier 28 will also help retain the food and/or liquid from escaping the absorbent layers 32 and 30.

The techniques for inexpensively manufacturing materials which are absorbent and materials which are slip-resistant and for joining such materials together are well known in the manufacture of paper, plastic, and rubber/latex products. These techniques can readily be used to manufacture a disposable, slip-resistant leak proof mat for high chairs and the like.

While the present invention has been described in connection with what is considered the most practical and preferred embodiment, it is understood that this invention is not limited to the disclosed embodiment but is intended to cover various arrangements and uses included within the spirit and scope of the broadest interpretation so as to encompass all such modifications and equivalent arrangements.

While the invention has been described with a certain degree of particularity, it is manifest that many changes may be made in the details of construction, the arrangement of components, number of sheets of material, and shape without departing from the spirit and scope of this disclosure. It is understood that the invention is not limited to the exemplified embodiment set forth herein.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to.

What is claimed is:

1. A disposable, absorbent high chair floor mat comprising:

a sheet comprised of a top generally rectangular layer comprised of a liquid absorbent material, a middle generally rectangular layer being generally coplanar with the top layer, such middle layer being comprised of an additional absorbent material and being joined to the top layer throughout their interface, a bottom generally rectangular layer being generally coplanar with the middle layer, such bottom layer being comprised of a slip-resistant, waterproof, non-adhesive material and being joined to the middle layer throughout their interface, such sheet defining a front edge, a back edge, and first and second side edges; and a first perforated line beginning at a point spaced inwardly from the first side edge and extending forward from the back edge to a point spaced inwardly from the back edge, such perforated line ending in a first shaped perforated design oriented inwardly of the first perforated line;

a second perforated line beginning at a point spaced inwardly from the second side edge and extending forward from the back edge to a point spaced inwardly from the back edge, such perforated line ending in a second shaped perforated design oriented inwardly of the second perforated line.

2. The disposable, absorbent high chair floor mat of claim 1 wherein the first and second perforated lines, including the first and second shaped perforated designs, are generally symmetrical about the centerline of the sheet.

3. The disposable, absorbent high chair mat of claim 2 wherein the first and second shaped perforated designs are generally triangularly-shaped and point generally towards each other across the centerline of the sheet.

4. The disposable, absorbent high chair mat of claim 1 wherein the first and second shaped perforated designs are generally half-moon-shaped and point generally toward each other across the centerline of the sheet.

5. A disposable, absorbent high chair floor mat comprising:

a plurality of layers of absorbent material generally coplanar with and joined to a slip-resistant, waterproof layer and defining a front edge, a back edge, and first and second side edges; and a plurality of perforated lines spaced inwardly from the first and second side edges and parallel with said edges and extending from the back edge toward the front edge, such perforated lines being generally symmetrical about the centerline extending from the back edge to the front edge.

6. The disposable, absorbent high chair floor mat of claim 5 wherein the perforated lines extend from the back edge continuously to the front edge.

7. A method for using a disposable, absorbent high chair floor mat, such mat defining a front edge, a back edge, first and second side edges, and having a first perforated line beginning at a point spaced inwardly from the first side edge and extending forward from the back edge to a point spaced inwardly from the back edge, such perforated line ending in a first generally triangularly-shaped perforated design pointing inwardly of the first perforated line, and a second perforated line beginning at a point spaced inwardly from the second side edge and extending forward from the back edge to a point spaced inwardly from the back edge, such perforated line ending in a second generally triangularly-shaped perforated design pointing inwardly of the second perforated line, such method comprising the steps of:

folding the center of the mat upwards by tearing along the perforated lines;

placing the mat on the floor around the two front legs of a high chair so that the back edge of the mat is generally aligned with the two back legs of the high chair;

unfolding the center of the mat so that it rests on the floor between the legs of and beneath the high chair;

feeding an infant or toddler seated in the high chair; and gathering up and throwing away the disposable, absorbent high chair mat.

* * * * *